United States Patent Office 3,329,732
Patented July 4, 1967

3,329,732
BICYCLOHEPTADIENE DIMERIZATION
Bruce N. Bastian, Lafayette, and Gerhard N. Schrauzer, Orinda, Calif., assignors to Shell Oil Company, New York, N.Y., a corporation of Delaware
No Drawing. Filed Oct. 20, 1965, Ser. No. 499,034
8 Claims. (Cl. 260—666)

This invention relates to an improved method for the dimerization of bicycloheptadiene.

Methods are known in the art for the dimerization of bicyclo(2.2.1)hepta-2,5-diene, herein for brevity termed bicycloheptadiene, to produce polycyclic dimer derivatives. Bird et al., Chem. and Ind., 20 (1960), disclose the reaction of bicycloheptadiene with certain metal carbonyls, e.g., iron carbonyl, to produce a product mixture containing bicycloheptadiene dimers along with major amounts of ketone products. The bicycloheptadiene dimers of Bird et al. are ethylenically unsaturated, containing from 1 to 2 ethylenic linkages, and are of two different ring systems. One type of bicycloheptadiene dimer is represented by the chemical formula pentacyclo($8.2.1.1^{4,7}.0^{2,9}.0^{3,8}$)tetradeca-5,11-diene, and the second type of unsaturated bicycloheptadiene dimer is represented by the chemical formula hexacyclo($7.2.1.1^{3,7}.1^{5,13}.0^{2,8}.0^{4,6}$)tetradec-10-ene. These dimers are represented, respectively, by the structural formulas

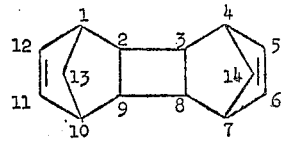

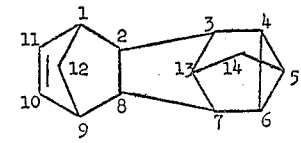

wherein the added numerals indicate one conventional method of identifying the relative locations of the carbon atoms present.

In co-pending application of Müller et al., U.S. Ser. No. 457,787, filed May 21, 1965, now issued as U.S. 3,282,663, there is disclosed and claimed certain compositions, useful as high energy fuel, which comprise mixtures of the above-depicted unsaturated bicycloheptadiene dimers. These compositions are useful as high energy fuels, particularly as fuels for jet aircraft, because of a unique combination of a relatively high heat of combustion per unit volume and a relatively low melting point. The process of dimer production described in the Müller et al. application results in the production of dimeric mixtures of both of the above-depicted dimer types. Although, as previously stated, the dimer mixture is useful per se, it would be of advantage to provide a method for the production of specific dimer components.

The co-pending application of Cannell, U.S. Ser. No. 368,344, filed May 18, 1964, now issued as U.S. 3,258,502, discloses and claims a method for the essentially exclusive production of bicycloheptadiene dimers of the above-depicted pentacyclic structure. However, methods for the essentially exclusive production of bicycloheptadiene dimers of the above-depicted hexacyclic structure have not heretofore been available.

It is an object of the present invention to provide an improved method for the dimerization of bicycloheptadiene. More particularly, it is an object to provide an improved method for the production of hexacyclo-($7.2.1.1^{3,7}.1^{5,13}.0^{2,8}.0^{4,6}$)tetradec-10-ene.

It has now been found that these objects are accomplished by contacting bicycloheptadiene, in liquid-phase solution in non-polar reaction solvent, with a catalyst comprising certain cobalt-containing carbonyl catalysts and a basic co-catalyst comprising certain tertiary organic amines. The process of the invention results in the formation of a dimer product containing a relatively quite high percentage of the hexacyclotetradecene product.

The catalysts to be employed in the process of the invention comprise certain transition metal salts of the tetracarbonylcobaltate anion represented by the formula $$M[Co(CO)_4]_n$$

wherein M is a metal selected from zinc, cadmium, mercury and indium, and n is the valence of the metal M. A preferred class of catalysts of the above formula are those catalysts wherein M is a Group II–B metal of atomic number from 30 to 48 inclusive, that is, those catalysts wherein M is zinc or cadmium and n is 2. Particularly preferred as catalyst is zinc tetracarbonylcobaltate.

The amount of the cobalt-containing carbonyl catalyst to be employed is not critical and catalytic quantities are sufficient. However, to obtain highest selectivity to the hexacyclic dimer, utilization of molar ratios of catalyst to bicycloheptadiene of from about 1:200 to about 1:10 is satisfactory, although molar ratios of from about 1:100 to about 1:50 are preferred.

The catalyst is employed in conjunction with a tertiary heterocyclic aromatic amine co-catalyst. Suitable amines are those containing at least one nitrogen atom, and preferably only one, as a member of a six-membered, otherwise carbocyclic aromatic ring wherein a carbon atom adjacent to the tertiary nitrogen is unsubstituted, i.e., is substituted only with hydrogen. Preferred amine co-catalysts are hydrocarbon amines, that is, contain only atoms of carbon and hydrogen besides the amine nitrogen atom(s), and are amines of up to 12 carbon atoms as illustrated by pyridine, pyrazine, quinoline, isoquinoline, quinoxaline, naphthyridine, β-picoline, 4-ethylpyridine, 3,5-lutidine, 3,4-lutidine, 3-methylquinoline, 4,5-dimethylisoquinoline and the like. A preferred class of co-catalysts comprises pyridine with up to three methyl substituents wherein at least one alpha carbon atom of the non- to trimethylpyridine is unsubstituted, other than by hydrogen. Pyridine is particularly preferred.

The co-catalyst is employed in molar excess over the cobalt-containing carbonyl catalyst. Molar ratios of co-catalyst to catalyst of from about 2:1 to about 30:1 are satisfactory with molar ratios of from about 5:1 to about 20:1 being preferred.

The dimerization is conducted in liquid-phase solution in an inert non-polar reaction solvent and solvents which are liquid at reaction temperature and pressure, which are esesntially non-polar in character and which are inert towards the bicycloheptadiene reactant and the dimer product are satisfactory. Preferred non-polar solvents comprise the hydrocarbons, particularly hydrocarbons free from aliphatic unsaturation including alkanes such as hexane, heptane, isooctane, decane and dodecane; cycloalkanes such as cyclohexane, cyclopentane, methylcyclopentane and decahydronaphthalene; and aromatic hydrocarbons including benzene, toluene, xylene, ethylbenzene and cumene.

The ratio of reaction solvent to the bicycloheptadiene reactant does not appear to be critical, although in order to obtain highest selectivity to the hexacyclotetradecene product it is preferred to avoid a too low catalyst concentration. Concentrations of the cobalt-containing carbonyl catalyst of about 0.03 mole/liter of solution or more are satisfactory with catalyst concentrations of at least about 0.05 mole/liter being preferred.

The method of effecting dimerization is not critical. In one modification, the entire amounts of bicycloheptadiene, catalyst, co-catalyst and reaction solvent are charged to an autoclave or similar reactor and the mixture is maintained at reaction temperature and pressure until reaction is complete. It is also useful to add one reaction mixture component to the others in increments, as by gradually adding the bicycloheptadiene to a mixture of the solvent and catalyst system. In yet another modification, the dimerization is conducted in a continuous manner as by contacting the bicycloheptadiene and catalyst system during passage through a tubular reactor. In any modification, the reaction is conducted at a somewhat elevated reaction temperature. Temperatures from about 40° C. to about 150° C. are generally satisfactory with the temperature range from about 50° C. to about 130° C. being preferred. Reaction pressures which are atmospheric, subatmospheric or superatmospheric are suitably employed provided the reaction mixture is maintained substantially in the liquid phase. Little advantage appears to arise from utilization of pressures which are substantially different from atmospheric and the use of substantially atmospheric pressure, e.g., from about 0.5 atmosphere to about 5 atmospheres, is preferred.

In order to maintain a high degree of catalyst selectivity toward the formation of hexacyclotetradecene products, the reaction is conducted in an inert reaction environment. Thus, it is preferred to effect dimerization in an oxygen-free, substantially anhydrous reaction environment.

Subsequent to reaction, the product mixture is separated and recovered by conventional means, as by selective extraction, fractional distillation, fractional crystallization or the like. For some applications, however, separation of individual catalyst components is not necessary as the product mixture, upon removal of solvent, is useful as such.

The product mixture comprises essentially the above-depicted hexacyclotetradecene with minor amounts of other unsaturated bicycloheptadiene dimers. The hexacyclotetradecene product is easily separable from other dimer product, although in some applications the dimer mixture is useful as such. As previously stated, the hexacyclo(7.2.1.1$^{3,7}$.1$^{5,13}$.0$^{2,8}$.0$^{4,6}$)tetradec-10-ene is useful as a component of high energy fuels.

To further illustrate the improved process of the invention the following examples are provided. It should be understood that the details thereof are not to be regarded as limitations, since they may be varied as will be understood by one skilled this art.

*Example I*

The zinc tetracarbonylcobaltate employed in the following examples was prepared by charging to an autoclave 12 g. of zinc dust and 400 ml. of a 10% solution of dicobalt octacarbonyl in toluene. Carbon monoxide was introduced to give a 3000 p.s.i. pressure (20° C.) and the autoclave was heated and maintained at 200° C. and 4750 p.s.i. for 12 hours. The reactor was then cooled and vented and the yellow solution was transferred under nitrogen to a low temperature crystallizer. The yield of $$Zn[Co(CO)_4]_2$$

a yellow crystalline solid, was 30.95 g.

By similar procedures $$In[Co(CO)_4]_3$$

and $$Cd[Co(CO)_4]_2$$

were prepared.

*Example II*

To a nitrogen-filled reactor were charged 5.03 g. of bicycloheptadiene, 0.5 millimole (mmole) of zinc tetracarbonylcobaltate, 8.1 mmoles of 3,5-lutidine and 10 ml. of toluene. The reaction mixture was maintained at 100° C. for a period of 17 hours and then removed, treated with sodium carbonate, filtered and distilled at reduced pressure. Gas-liquid chromatographic analysis of the product mixture indicated the presence of 43.2% by weight of unreacted bicycloheptadiene and 51.1% by weight of hexacyclo(7.2.1.1$^{3,7}$.1$^{5,13}$.0$^{2,8}$.0$^{4,6}$)tetradec-10-ene.

*Example III*

The procedure of Example II was followed to effect dimerization of bicycloheptadiene under varying conditions in the presence of various catalysts and various co-catalysts. The results of these runs are shown in Table I wherein the heading "M" refers to the metal portion of the $M[Co(CO)_4]_n$ catalyst and the term "mmole" represents millimole. In each case the percent by weight in the product mixture of the hexacyclotetradecene product was determined, as well as the percent by weight of unreacted bicycloheptadiene, by gas-liquid chromatographic analysis.

TABLE I

| M, mmole | Co-catalyst, mmole | Time, hr. | Temp., ° C. | Unreacted Bicycloheptadiene, percent wt. | Hexacyclic Dimer, percent wt. |
|---|---|---|---|---|---|
| Zn, 1.0 | Pyridine, 21.4 | 4.67 | 100 | 16.6 | 79.2 |
| Cd, 0.5 | Pyridine, 23.8 | 5.25 | 100 | 41.5 | 56.6 |
| Zn, 0.5 | 3,5-lutidine, 8.9 | 0.1 | 95 | 47.4 | 49.3 |
| Zn, 0.5 | Quinoline, 8.9 | 16 | 95 | 36.7 | 55.8 |
| Hg, 0.5 | 3,5-lutidine, 9.1 | 72 | 100 | 83.6 | 14.7 |
| Cd, 0.5 | 3,5-lutidine, 8.6 | 72 | 100 | 47.8 | 44.9 |
| In, 0.5 | 3,5-lutidine, 9.3 | 72 | 100 | 77.8 | 22.2 |
| Zn, 2.0 | None | 3.5 | 100 | 0.7 | 0.0 |
| Cd, 0.5 | ___do___ | 4.1 | 100 | 11.1 | 16.3 |

We claim as our invention:

1. The process of selectively producing hexacyclo (7.2.1.1$^{3,7}$.1$^{5,13}$.0$^{2,8}$.0$^{4,6}$)tetradec-10-ene as the major bicycloheptadiene dimer product by intimately contacting bicyclo(2.2.1)hepta-2,5-diene with (a) from about 0.005 mole to about 0.1 mole per mole of said bicycloheptadiene of the cobalt-containing carbonyl catalyst of the formula $$M[Co(CO)_4]_n$$

wherein M is zinc, cadmium, mercury or indium and $n$ is the valence of the metal M, and (b) from about 2 moles to about 30 moles per mole of said catalyst of a tertiary heterocyclic aromatic amine co-catalyst of at least one nitrogen atom as a member of a six-membered, otherwise carbocyclic aromatic ring wherein a carbon atom adjacent to a tertiary nitrogen atom is unsubstituted other than by hydrogen; in liquid-phase solution in inert nonpolar hydrocarbon reaction solvent, the concentration of said catalyst in said solution being at least about 0.03 mole per liter, in an inert, substantially anhydrous reaction environment at a temperature from about 40° C. to about 150° C.

2. The process of claim 1 wherein M is zinc or cadmium.

3. The process of claim 1 wherein the co-catalyst is non- to tri-methylpyridine wherein at least one alpha-carbon atom is unsubstituted other than by hydrogen.

4. The process of claim 3 wherein the catalyst is zinc tetracarbonylcobaltate.

5. The process of claim 4 wherein the co-catalyst is pyridine.

6. The process of claim 4 wherein the co-catalyst is 3,5-lutidine.

7. The process of claim 3 wherein the catalyst is cadmium tetracarbonylcobaltate.

8. The process of claim 7 wherein the co-catalyst is pyridine.

References Cited

C. W. Bird et al. (I), Chem. & Ind., pages 20–21, 1960.
C. W. Bird et al. (II), Tetrahedron Letters, No. 11, pages 373–375, 1961.

DELBERT E. GANTZ, *Primary Examiner.*

V. O'KEEFE, *Examiner.*